(12) United States Patent
VanBlon (10) Patent No.: US 9,620,122 B2
(45) Date of Patent: Apr. 11, 2017

(54) HYBRID SPEECH RECOGNITION

(75) Inventor: Russell Speight VanBlon, Raleigh, NC (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 940 days.

(21) Appl. No.: 13/314,533

(22) Filed: Dec. 8, 2011

(65) Prior Publication Data

US 2013/0151250 A1     Jun. 13, 2013

(51) Int. Cl.
| | | |
|---|---|---|
| *G10L 15/32* | (2013.01) | |
| *G10L 15/30* | (2013.01) | |
| *G06F 3/0488* | (2013.01) | |
| *G06K 9/00* | (2006.01) | |

(52) U.S. Cl.
CPC ............. *G10L 15/32* (2013.01); *G10L 15/30* (2013.01); *G06F 3/04883* (2013.01); *G06K 9/00402* (2013.01)

(58) Field of Classification Search
CPC ......... G10L 15/22; G10L 15/30; G10L 15/32; G10L 15/26; G06F 3/167; H04M 2250/74
USPC .................. 704/10, 201, 231, 235, 257, 275
See application file for complete search history.

(56) References Cited

U.S. PATENT DOCUMENTS

| | | | | |
|---|---|---|---|---|
| 5,598,534 A * | 1/1997 | Haas | ...................... | G06K 9/222 710/7 |
| 5,839,106 A * | 11/1998 | Bellegarda | .......... | G10L 15/1815 704/243 |
| 6,292,779 B1 * | 9/2001 | Wilson | .................... | G10L 15/26 704/255 |
| 6,385,586 B1 * | 5/2002 | Dietz | .................... | G06F 17/289 704/251 |
| 6,418,199 B1 * | 7/2002 | Perrone | ...................... | 379/88.01 |
| 6,915,258 B2 * | 7/2005 | Kontonassios | ......... | G10L 15/22 704/233 |
| 7,113,173 B1 * | 9/2006 | Bi | ....................... | G06F 3/03545 345/156 |
| 8,196,066 B1 * | 6/2012 | Ouyang | ............. | G06F 3/04883 715/708 |
| 8,401,293 B2 * | 3/2013 | Antonijevic | ........... | G06K 9/344 382/177 |
| 8,630,685 B2 * | 1/2014 | Schrage | .................. | H04M 1/58 381/357 |
| 9,135,809 B2 * | 9/2015 | Chang | .................... | G08C 17/00 |
| 2002/0133341 A1 * | 9/2002 | Gillick | .................... | G10L 15/32 704/235 |
| 2003/0120486 A1 * | 6/2003 | Brittan | .................... | G10L 15/32 704/231 |
| 2003/0122802 A1 * | 7/2003 | Bryborn | ................ | G06K 9/222 345/173 |

(Continued)

*Primary Examiner* — Douglas Godbold
*Assistant Examiner* — Mark Villena
(74) *Attorney, Agent, or Firm* — John L. Rogitz; John M. Rogitz (57) ABSTRACT

Described is a technology by which speech is locally and remotely recognized in a hybrid way. Speech is input and recognized locally, with remote recognition invoked if locally recognized speech data was not confidently recognized. The part of the speech that was not confidently recognized is sent to the remote recognizer, along with any confidently recognized text, which the remote recognizer may use as context data in interpreting the part of the speech data that was sent. Alternative text candidates may be sent instead of corresponding speech to the remote recognizer.

15 Claims, 6 Drawing Sheets

(56) References Cited

U.S. PATENT DOCUMENTS

| Publication No. | Date | Inventor | Classification/Page |
|---|---|---|---|
| 2003/0212559 A1* | 11/2003 | Xie | G10L 13/04 704/260 |
| 2004/0267528 A9* | 12/2004 | Roth et al. | 704/251 |
| 2005/0010411 A1* | 1/2005 | Rigazio et al. | 704/246 |
| 2005/0071163 A1* | 3/2005 | Aaron | G10L 13/10 704/260 |
| 2005/0131686 A1* | 6/2005 | Yamamoto | G10L 15/197 704/231 |
| 2005/0136955 A1* | 6/2005 | Mumick | H04L 12/5895 455/466 |
| 2005/0147301 A1 | 7/2005 | Wang et al. | |
| 2005/0152602 A1* | 7/2005 | Chen | G06K 9/222 382/187 |
| 2006/0009980 A1* | 1/2006 | Burke | G10L 15/32 704/270 |
| 2006/0259294 A1* | 11/2006 | Tashereau | 704/10 |
| 2007/0156411 A1* | 7/2007 | Burns | G10L 15/22 704/275 |
| 2007/0271087 A1* | 11/2007 | Slavik | G06K 9/6814 704/9 |
| 2007/0283270 A1* | 12/2007 | Sand et al. | 715/727 |
| 2007/0286486 A1* | 12/2007 | Goldstein | G06K 9/00422 382/187 |
| 2008/0059188 A1* | 3/2008 | Konopka et al. | 704/257 |
| 2008/0167028 A1* | 7/2008 | Gintz | H04M 3/527 455/419 |
| 2008/0170785 A1* | 7/2008 | Simmons | G06F 17/24 382/176 |
| 2008/0235023 A1* | 9/2008 | Kennewick et al. | 704/257 |
| 2009/0204409 A1* | 8/2009 | Mozer | G10L 15/30 704/275 |
| 2009/0204410 A1* | 8/2009 | Mozer et al. | 704/275 |
| 2009/0259473 A1* | 10/2009 | Chang | G11B 27/034 704/260 |
| 2009/0312972 A1* | 12/2009 | Muller | G01R 31/31709 702/82 |
| 2010/0082343 A1* | 4/2010 | Levit et al. | 704/257 |
| 2010/0256978 A1* | 10/2010 | Rosenbaum | 704/244 |
| 2010/0286985 A1* | 11/2010 | Kennewick et al. | 704/257 |
| 2011/0010170 A1* | 1/2011 | Burns et al. | 704/231 |
| 2011/0015928 A1* | 1/2011 | Odell | G10L 15/30 704/257 |
| 2011/0184730 A1* | 7/2011 | LeBeau et al. | 704/201 |
| 2011/0320353 A1* | 12/2011 | Mehew | G06Q 20/206 705/44 |
| 2012/0215543 A1* | 8/2012 | Oz et al. | 704/275 |
| 2012/0253798 A1* | 10/2012 | Walters | G10L 21/0208 704/226 |
| 2012/0259627 A1* | 10/2012 | Willett et al. | 704/231 |
| 2012/0299701 A1* | 11/2012 | Zou | G06F 21/31 340/5.54 |
| 2012/0308209 A1* | 12/2012 | Zaletel | G11B 27/034 386/278 |
| 2013/0030804 A1* | 1/2013 | Zavaliagkos et al. | 704/235 |
| 2013/0072280 A1* | 3/2013 | Yacenda | G07F 17/3225 463/17 |
| 2013/0080177 A1* | 3/2013 | Chen | 704/275 |
| 2015/0199320 A1* | 7/2015 | Ho | G06F 3/017 715/233 |

* cited by examiner

HYBRID SPEECH RECOGNITION

BACKGROUND

Contemporary mobile devices such as smartphones and other devices are able to perform speech-to-text recognition. In general, processing the speech on the device (locally) does not provide results that are as good as sending the speech to a remote server for processing. This is generally because the remote server has more computing power and more model data compared to a mobile device. Further, in many instances, the remote server executes a more complex recognition program, such as one having the ability to not only recognize the speech as words, but to also consider the surrounding context of other words in recognizing the speech. Thus, many mobile devices are configured to use a remote server to perform the recognition.

However, as recognized by the inventor, sending voice data to a server can be relatively slow, particularly when a device is connected to a slow network. Even moderate amounts of speech take a long time to transmit, and thus cause the overall speech recognition process to seem extremely slow. In fact, the speech recognition process sometimes times out before the recognition results are obtained. Remote speech recognition with a slow network results in a poor user experience. Additional efficiency considerations such as the expense of sending large amounts of data (for users with limited data plans) further makes sending such large amounts of data undesirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which local and remote recognizers such as speech or handwriting recognizers are used in a hybrid way that provides recognition results. In one aspect, data for recognition such as speech data is input and recognized on a first recognizer into a first recognition result comprising recognized text. A hybrid recognition program evaluates recognition confidence with respect to the first recognition result. If not confident as to at least part of the first recognition result, any non-confident data is sent to a second recognizer, in conjunction with any confidently recognized text of the first recognition result. When the second recognition result from the second recognizer is received, text corresponding to the first recognition result and/or the second recognition result may be output.

In one aspect, a mixture of confidently recognized text data at the first recognizer, corresponding to a local recognizer, is sent with non-confidently recognized speech data to the second recognizer corresponding to a remote recognizer. In this example scenario, the remote recognizer receives only the part of the speech data that was not confidently recognized, along with the confidently recognized text which the remote recognizer may use as context data in interpreting the speech.

In another aspect, alternative text candidates comprising word sets of one or more words may be sent instead of corresponding speech to the remote recognizer. The remote recognizer may use context-based processing to determine which word set to use.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards efficient and accurate speech recognition on a device that is configured to locally recognize speech and communicate remotely. Input speech is locally recognized; by using any local recognition results that were confidently recognized, a hybrid speech recognition program on the device is able to send a reduced amount of data to a remote server (recognition service) for further recognition. For example, the hybrid speech recognition program may send to the remote server only the speech parts corresponding to words that were locally recognized with low confidence. This reduced amount of speech data may be sent in conjunction with confidently recognized text to provide surrounding context (a preceding and/or subsequent word set) for interpreting the speech data. In another scenario, the hybrid speech recognition program may send recognized text to the remote server with recognition alternatives, whereby the remote server may perform context analysis on the text alternatives to determine the most likely intended speech.

It should be understood that any of the examples herein are non-limiting. For example, the technology described herein applies to any computing device capable of local speech processing and remote communication, not necessarily mobile devices. Further, the technology may be applied to other types of recognition problems, such as handwriting or character recognition. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and speech recognition in general.

Figure 1:
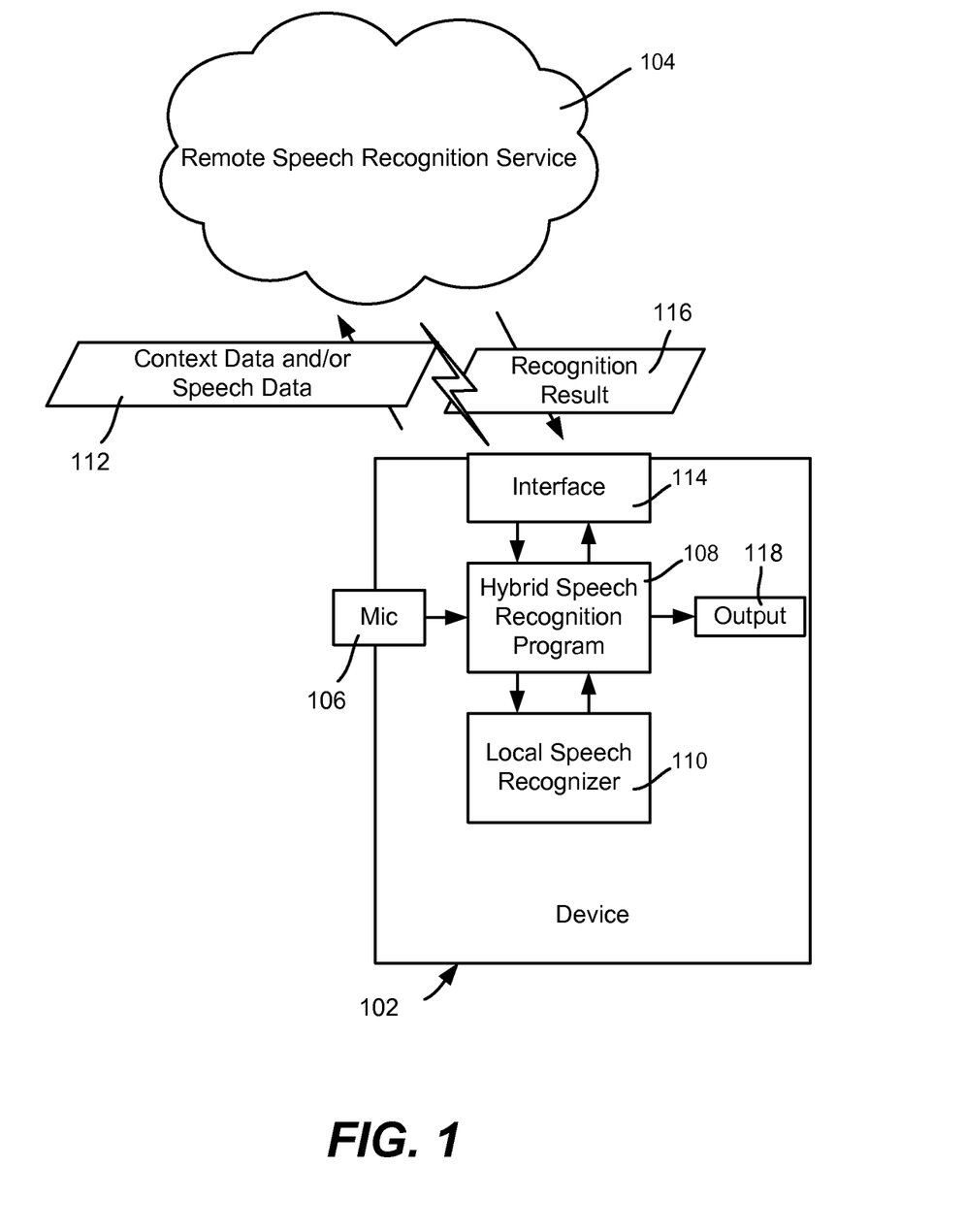
FIG. 1 is a block diagram showing local components of a device configured for hybrid local and remote speech recognition according to one example embodiment.

FIG. 1 shows an environment in which a device 102 such as a smartphone communicates with a remote speech recognition service 104 to facilitate hybrid speech recognition as described herein. In general, speech detected at a microphone (mic) 106 (or possibly other audio such as pre-recorded audio) is received as utterance data, which in this example is shown as being received at a hybrid speech recognition program 108. The hybrid speech recognition program 108 works in conjunction with (or incorporates) a local speech recognizer component 110 to recognize the speech into a first set of text.

Various speech recognition results may be returned as this first set of text. In one embodiment, the speech is initially segmented into likely words, with each segment recognized as a word. Text for each word, accompanied by a confidence level, is returned. A set of alternative words for each segment may be returned, with an associated confidence score for each alternative word.

One recognition issue results when a word has a low confidence score. In such an instance, a more powerful remote recognizer may be able to better recognize the utterance than the local recognizer 110. This may be for various reasons, for example because the remote recognizer may have been trained with more samples for that word and the user is pronouncing the word in a way that the remote recognizer has been trained to more closely understand while the local recognizer has not.

Another recognition issue results from homophones, in which the same utterance results in candidate words with different spellings, such as "there," "their" and "they're" as one well-known example. The context of any surrounding words is one way to determine the correct word, however many local recognizers are not capable of context processing.

Yet another issue results from segmentation. As can be readily appreciated, multiple ways to segment speech may exist depending on the capabilities of the recognizer. For example, an utterance may be segmented into "ice cream" or "I scream" whereby two possible segmentations, both of which are reasonable, may be produced for word recognition. Thus, a more powerful recognizer, again equipped with enhanced segmentation and/or context recognition capabilities, may provide a correct result.

Thus, there are many situations in which a remote recognizer is able to provide more accurate recognition results than a local recognizer. However, as set forth above, sending speech to a remote recognizer may be inefficient, in sending speech is slow over slow network connections and/or also may be costly to users.

To efficiently provide recognized text, the hybrid speech recognition program 108 communicates locally recognized text (represented by the block of data 112) to the remote speech recognition service 104 for use as context data, which may or may not be mixed with speech data. As shown in FIG. 1, the communication is via a suitable wireless interface component 114 (e.g., representing software, hardware and an antenna), however it is understood that any wired or wireless coupling may be used.

As will be understood, the local recognition that was performed allows transmitting far less speech data to the remote speech recognition service 104, compared to sending the full set of speech; (indeed, in certain scenarios, no speech data need be sent as described below). The remote speech recognition service 104 processes the context and/or speech data 112 and returns a recognition result 116, which the hybrid speech recognition program 108 may then return or further process to provide output 118, e.g., to a display, to another program, or the like.

The remote speech recognition service 104 may be adapted in various ways to accept and process a combination of text and speech. In one alternative, the remote speech recognition service 104 may recognize the received speech and insert the recognized word or words into the provided text before performing context-based processing, and thereby obtain a full context-based result. In another alternative, the remote speech recognition service 104 may convert any received text to speech (perform text-to-speech processing) and place the generated speech in the appropriate place or places relative to the received speech data to recreate the entire initial utterance for recognition; (note that some pre-processing may be performed on the received speech data before generating speech from the text, such as to determine whether to use a male or female text-to-speech generator).

Figure 2:
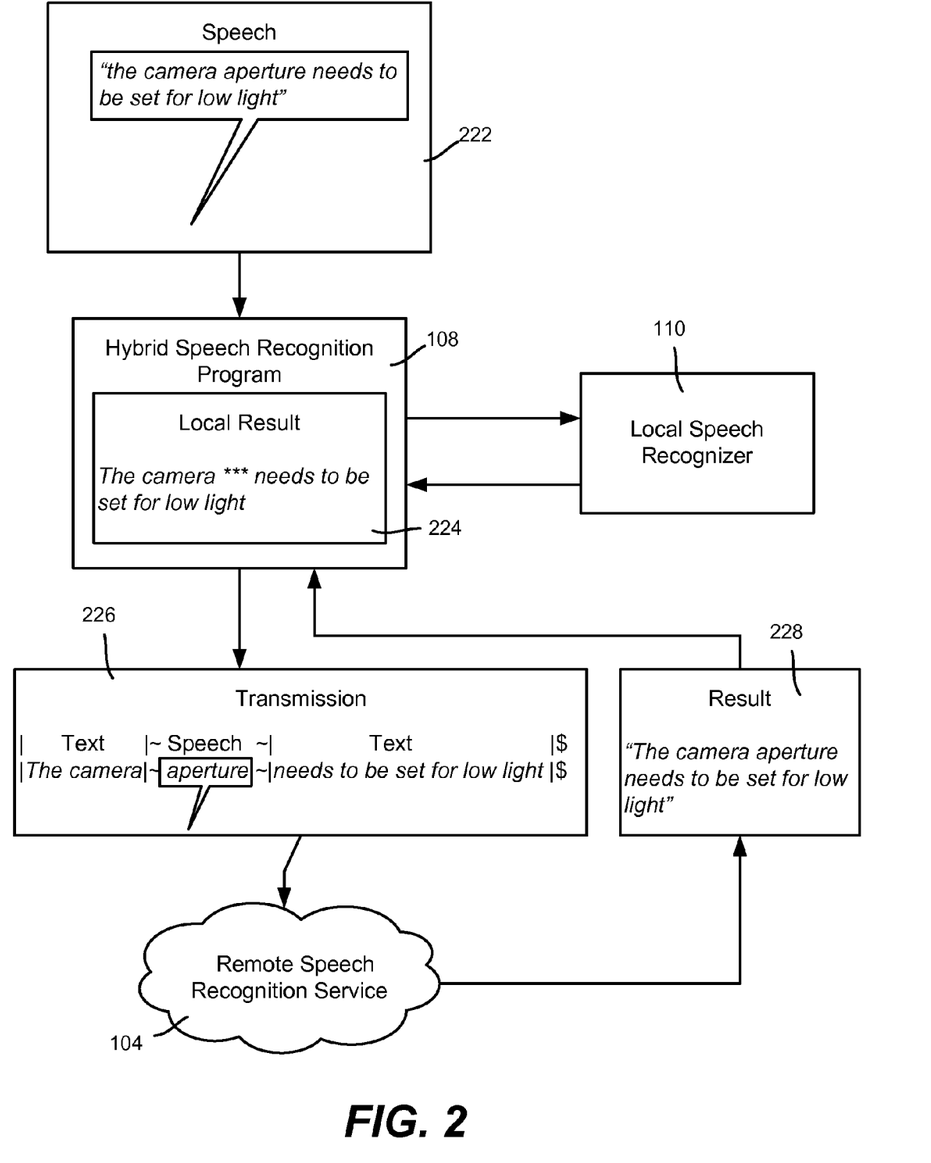
FIG. 2 is a block diagram/dataflow diagram showing an example of how hybrid speech recognition may be used to efficiently recognize speech having a mixture of high confidence recognition and low confidence recognition according to one example embodiment.

FIG. 2 shows an example of how the hybrid speech recognition program 108 operates to efficiently obtain a final recognition result from a combination of local and remote recognition. In FIG. 2, speech 222 is received at the hybrid speech recognition program, and sent to the local speech recognizer to receive a local result 224. In this example, most of the speech is recognized with high confidence, however the word "aperture" is returned with low confidence, as represented in FIG. 2 by the three asterisks (***) within the recognized text of the local result 224. Any confidence criterion such as a suitable threshold may be used for a confidence level, and the threshold may be variable, e.g., based upon the connection speed to the remote service 14, if known.

In this example, the hybrid speech recognition program 108 thus determines that a more accurate recognition may be obtained by invoking the remote speech recognition service 104. As described above, sending the full speech over the network connection is often inefficient, e.g., is slow and/or potentially costly.

To efficiently obtain recognition results, the hybrid speech recognition program 108 reduces the amount of speech data sent, in this example by sending the confidently recognized text along with only the speech data corresponding to low confidence results (the speech for "aperture") to the remote speech recognition service 104. As is understood, the text may be represented with amounts of data on the order of tens to hundreds of bytes, whereas speech data may be on the order of kilobytes or more. Virtually any suitable way to encode the text data and the speech data may be used in the transmission data structure 226, and/or the text data and the speech data may be included in virtually any suitable data structure. For simplicity and visibility, FIG. 2 shows separator characters, "|" for the text words and "~" for the speech data (represented in FIG. 2 by a "balloon" containing the spoken word), with the "$" representing the end of the data; however it is understood that any suitable encoding technique may be used, including inserting a pointer or other reference to each block of speech data at each one's position within the text words.

As can be seen, the remote speech recognition service 104 thus obtains the benefit of the surrounding text context without having to receive the full amount of speech data. In the example of FIG. 2, the remote speech recognition service 104 is able to recognize the word "aperture" from the surrounding context and/or via more powerful recognition processing, and thus returns the fully recognized text in the result 228.

Figure 3:
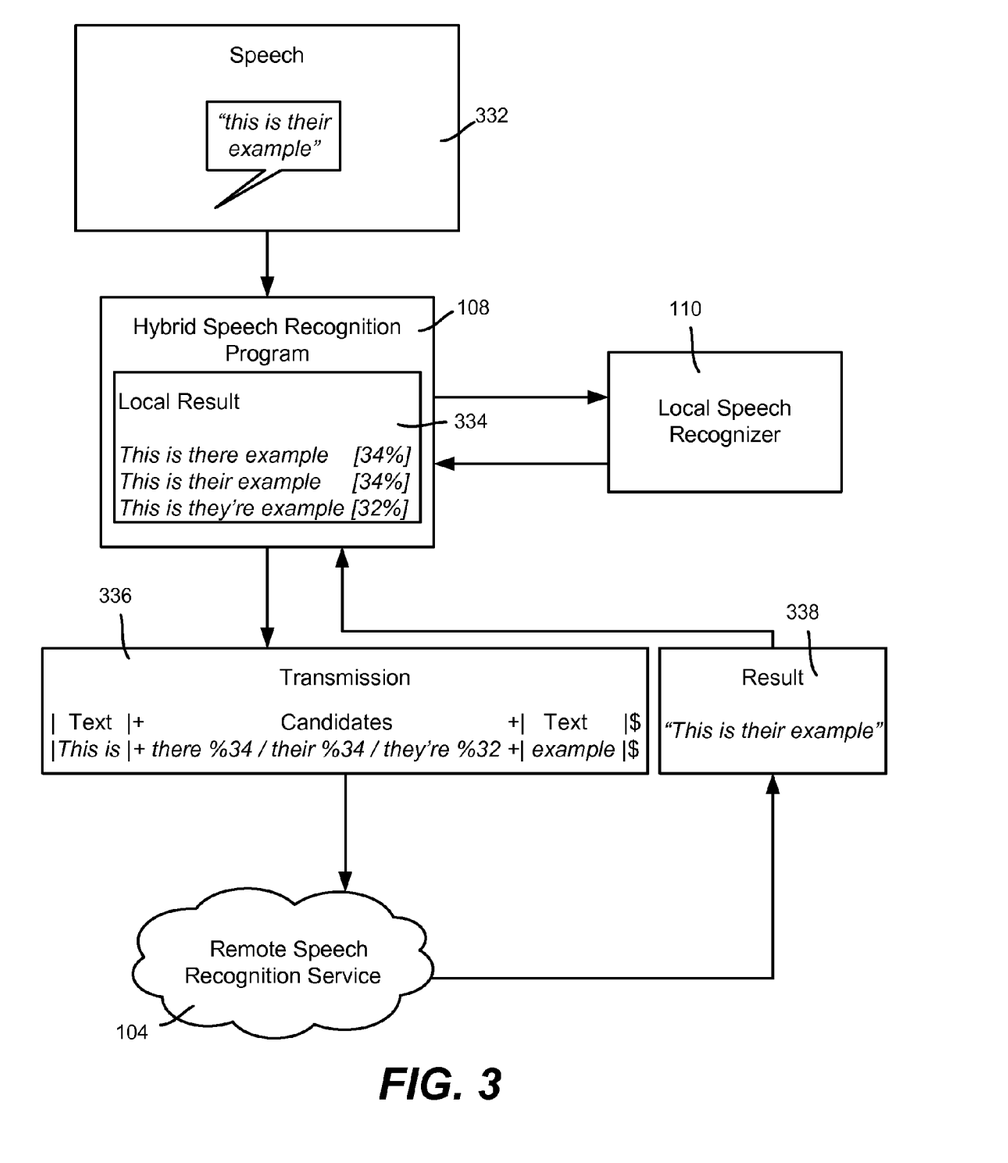
FIG. 3 is a block diagram/dataflow diagram showing an example of how hybrid speech recognition may be used to efficiently recognize speech having a mixture of high confidence recognition and low confidence recognition resulting from homophone-based ambiguity according to one example embodiment.

FIG. 3 shows another example, in which speech 332 fed to the local recognizer 110 produces a local result 334 such that the words are recognized to a reasonable confidence level. In this example, however, there are multiple candidate words that are recognized, with no candidate having a sufficiently high confidence level to allow a selection to be made. This may occur with a local recognizer that is not configured for context-based recognition, and thus can recognize speech in a way that obtains ambiguous results, e.g., because of the homophone issue. In the example of FIG. 3, the confidence level scores are shown as percentages following each result, however as can be readily appreciated, any other appropriate scoring system for confidence levels may be used.

As can be readily appreciated, one way to resolve the issue is to use the solution set forth with reference to FIG. 2 and send the speech for the word (the speech corresponding to "their") that causes the ambiguity. An alternative way represented in FIG. 3 is to send the text for those words recognized without ambiguity, as well as the text for the recognized ambiguous candidate words. In this example, only text need be sent, with the remote speech recognition service 104 tasked with using the surrounding context to obtain a correct result.

In the example transmission data structure 336 of FIG. 3, the hybrid speech recognition program 108 has inserted the candidates "there" "there" and "they're" into the confidently recognized text. For simplicity and visibility, FIG. 3 shows separator characters, "|" for the text words and "+" for the candidates (each candidate followed by % and the value of its confidence score), with a "/" between each candidate and score, however any suitable encoding technique may be used.

As can be seen, the remote speech recognition service 104 uses the context of the surrounding text to select an appropriate one of the candidates. The more accurately recognized result 338 ("This is their example") is returned.

Figure 4:
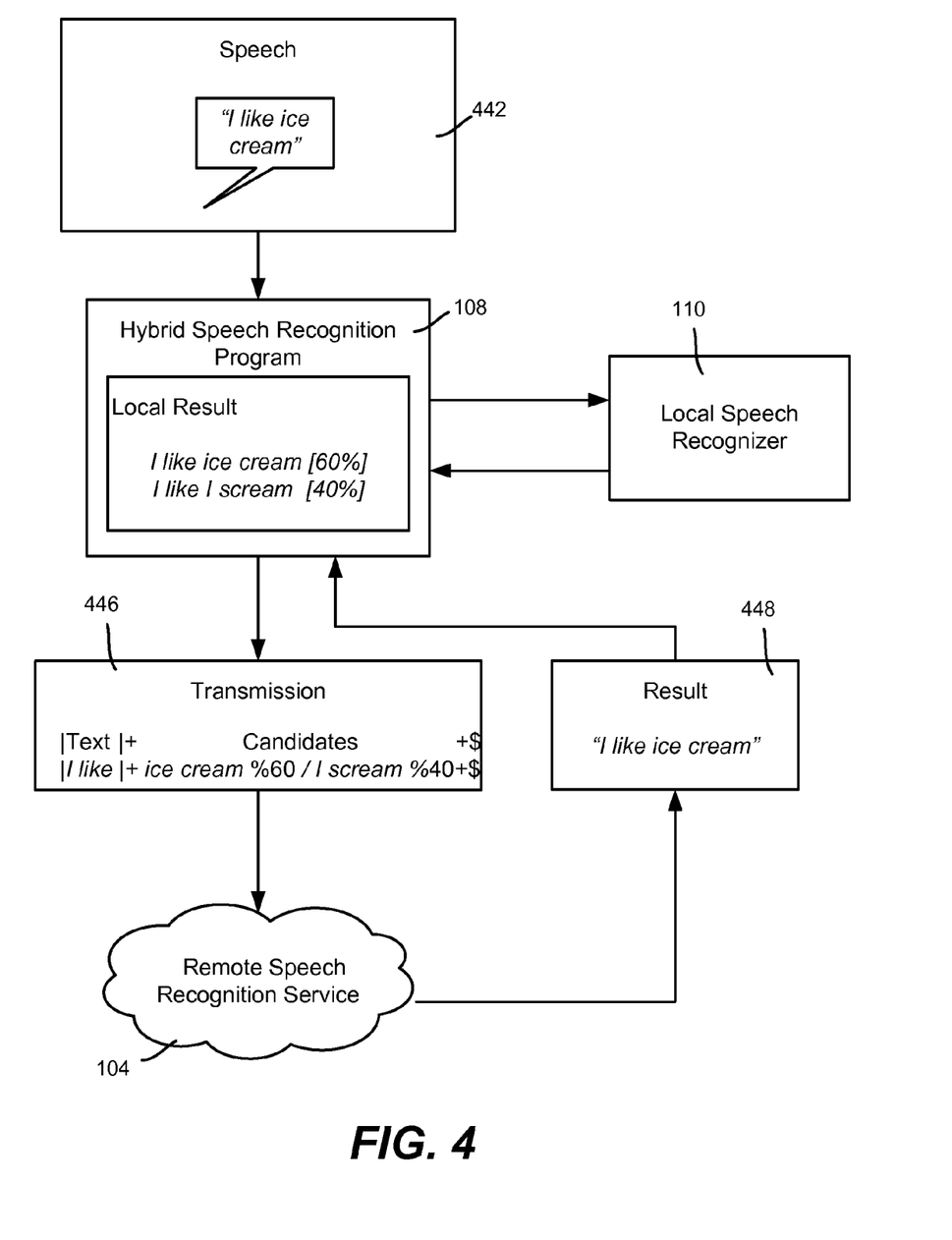
FIG. 4 is a block diagram/data flow diagram showing an example of how hybrid speech recognition may be used to efficiently recognize speech having a mixture of high confidence recognition and low confidence recognition resulting from ambiguous segmentation according to one example embodiment.

FIG. 4 shows another example, in which speech 442 fed to the local recognizer 110 produces a local result 444 such that there is ambiguity. In this example, although the words are recognized to a reasonable confidence level, there are multiple candidates word sets (each comprising one or more words) because of multiple segmentation alternatives, resulting in insufficient recognition confidence. This may occur with a local recognizer that is not configured for context-based recognition and thus recognizes the words but with ambiguous results, e.g., because of the segmentation issue.

As can be readily appreciated, one way to resolve the issue is to use the solution described above with reference to FIG. 2 and send the speech for any ambiguous segments (the speech segment corresponding to "ice cream" or "I scream") to the remote recognizer. This may be beneficial in situations where the local recognizer does not have as good of a segmentation mechanism as does the remote recognizer.

An alternative way represented in FIG. 4 is to send the text for those words that were recognized without ambiguity, as well as the recognized candidate word set (one or more words) for each segment. In the example of FIG. 4, the local recognizer has confidence in the word recognition, but not the segmentation, whereby only text is sent. The remote speech recognition service 104 is tasked with using the surrounding context (in this example there is only preceding context) to obtain a correct result.

In the example transmission data structure 446 of FIG. 4, the hybrid speech recognition program 108 has inserted the recognized word sets ("I scream" and "ice cream") corresponding to the candidate segments after the confidently recognized text. For simplicity and visibility, FIG. 4 shows separator characters, "|" for the confidently recognized text words and "+" for the candidate word sets, (each candidate word set appended with a % value confidence score), with a "/" between each candidate word set. As can be readily appreciated, any suitable encoding technique may be used.

As can be seen, the remote speech recognition service 104 uses the context of the surrounding text to select an appropriate one word set corresponding to one of the candidate segments. The more accurately recognized result 448 ("I like ice cream") is returned.

Note that although the examples of FIGS. 2-4 show the remote speech recognition service 104 processing the transmitted data into the correct recognition results, the remote speech recognition service 104 may not always do so. One possible reason for this is that the local recognizer may be more customized with respect to some level of user training than the remote recognizer; other reasons such as overfitting of training data may exist.

As with other recognizers, the remote speech recognition service 104 may return confidence scores for each word set (e.g., single words or phrases) that is returned. The hybrid speech recognition program 108 may compare the local/remote confidence scores to obtain a high confidence final result, possibly merging the results from each recognizer. For example, for a larger set of text such as a paragraph, the remote recognizer may return a higher confidence score for some of the word sets of that paragraph, but a lower confidence score for other word sets than what the local recognizer originally had computed (although low enough so as to have asked for remote recognition). The hybrid speech recognition program 108 may select the highest scored word sets in each such instance. For any such word sets that the remote service 104 cannot process with high confidence, those portions of text may be output to the user as low-confidence word sets marked for the user to consider editing.

Figure 5:
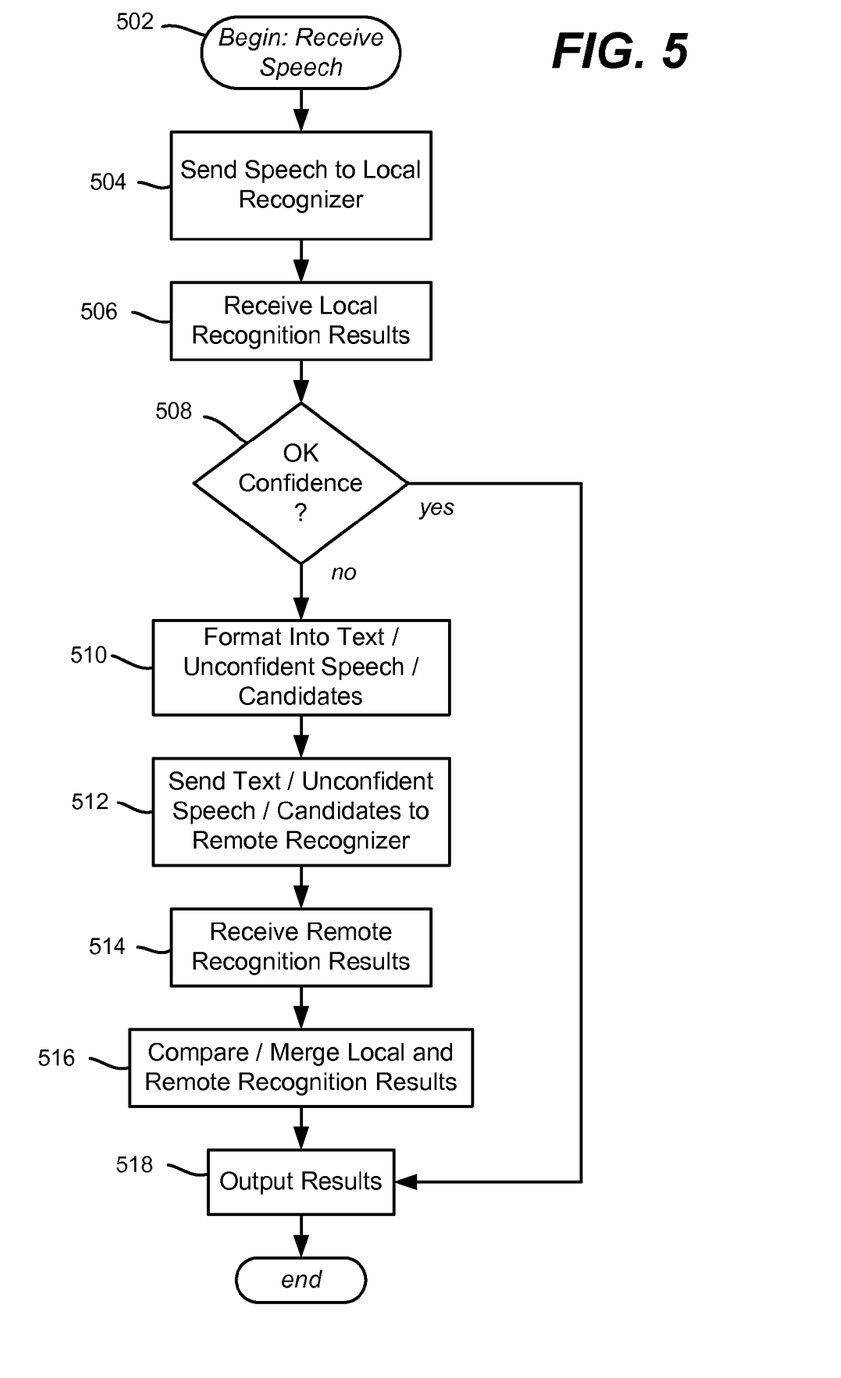
FIG. 5 is a flow diagram representing example steps that may be taken by a computing device to perform hybrid speech recognition in one embodiment.

FIG. 5 is a flow diagram showing example steps of the hybrid speech recognition program 108 in one example embodiment, beginning at step 502 where some speech to be recognized is received. Steps 504 and 506 represent sending the speech to the local recognizer and receiving the local recognition results, respectively.

Step 508 represents determining whether the entire set of speech (e.g., each word, phrase, sentence and/or paragraph) has a sufficient recognition confidence score to return the result set "as is" for output. If so, the process branches to step 518 to output the recognition results; note that in such an instance, remote processing of the speech is not necessary at all.

If any part of the speech is not recognized with sufficiently high confidence, then remote recognition is invoked. As described above, remote recognition may be invoked for a combination of confidently recognized text and non-confidently recognized speech (the example of FIG. 2), and/or for confidently recognized text and candidates for text that need to be resolved via context-based processing (the examples of FIG. 3 and/or FIG. 4). Step 510 represents formatting the local recognition results into the text, candidates and/or unconfident speech for transmission (step 512) to the remote recognition service for further processing.

Step 514 represents receiving the remote recognition results back at the hybrid speech recognition program 108. Step 516 represents comparing and/or merging those results as described above, as appropriate, to provide a final result which is then output at step 518. Step 516 also may include visibly indicating in some way any of those word sets that still have a low confidence score, to suggest user editing, as described above.

As can be seen, only portions of speech data may be sent for remote recognition, e.g., corresponding to words/phrases that have low recognition confidence and/or comprise context-sensitive word sets. Words that have high confidence and are not context-sensitive are processed locally; if all speech data processed locally has high recognition confidence (meets a confidence criterion), remote processing may be skipped.

For local results having a mix of high and low recognition confidence, the locally processed results of high recognition confidence words are sent to the server as text, not as speech data. Data sent to the remote server thus may include a combination of text and speech data, e.g., transmitted in the same order the data was spoken (or at least able to be realigned for context-based processing). The remote recognizer may use the received text to process the remaining words, and/or resolve ambiguities. In this way, the technology described herein is able to significantly reduce the size of data transmissions related to speech recognition processing.

Example Environment

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 6:
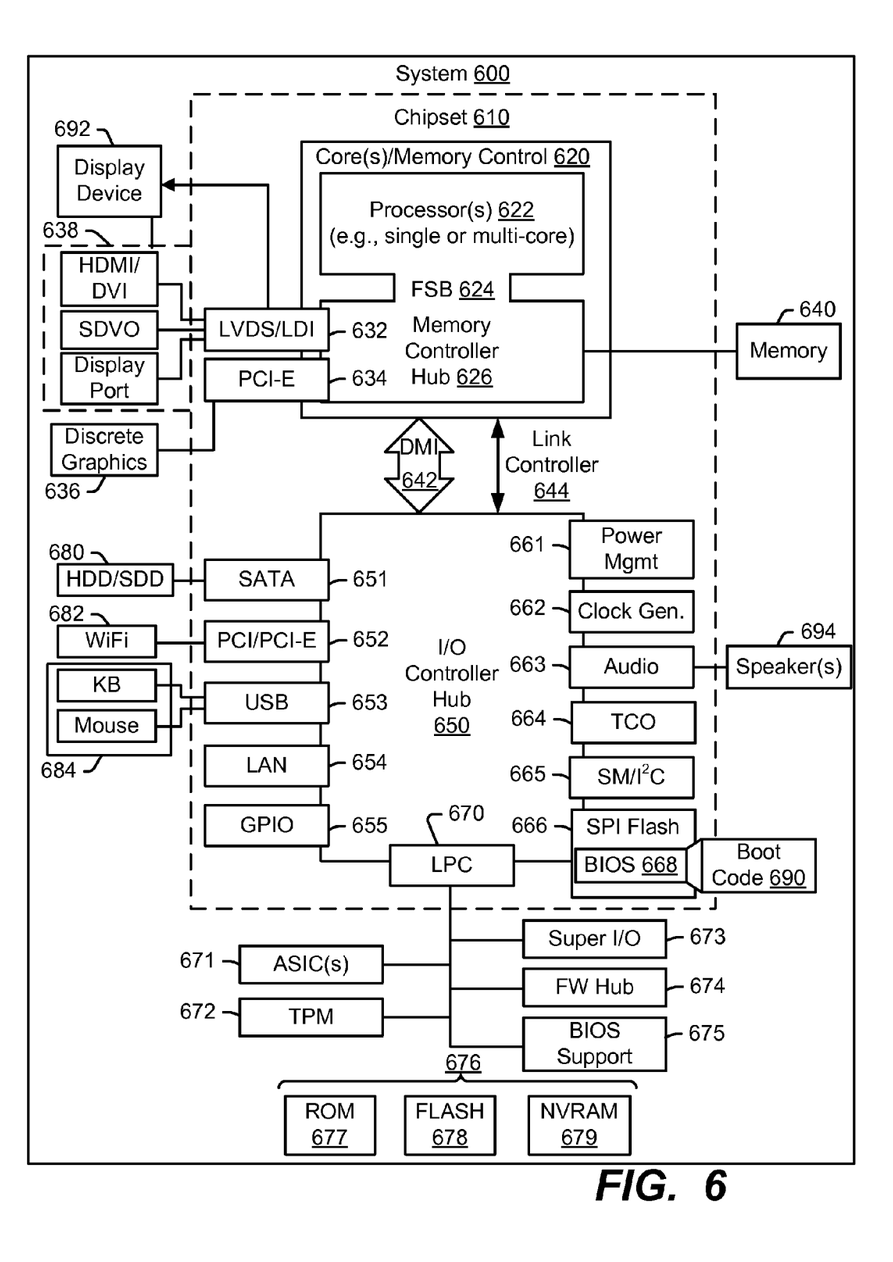
FIG. 6 is a block diagram representing an example computing environment into which aspects of the subject matter described herein may be incorporated.

While various example circuits or circuitry are discussed, FIG. 6 depicts a block diagram of an illustrative example computer system 600. The system 600 may be a laptop, tablet or desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 600.

The system 600 of FIG. 6 includes a so-called chipset 610 (a group of integrated circuits, or chips, that work together, chipsets) with an architecture that may vary depending on manufacturer (e.g., INTEL®, AMD®, etc.). The architecture of the chipset 610 includes a core and memory control group 620 and an I/O controller hub 650 that exchange information (e.g., data, signals, commands, etc.) via a direct management interface (DMI) 642 or a link controller 644. In FIG. 6, the DMI 642 is a chip-to-chip interface (sometimes referred to as being a link between a "northbridge" and a "southbridge"). The core and memory control group 620 include one or more processors 622 (e.g., single or multi-core) and a memory controller hub 626 that exchange information via a front side bus (FSB) 624; noting that components of the group 620 may be integrated in a chip that supplants the conventional "northbridge" style architecture.

In FIG. 6, the memory controller hub 626 interfaces with memory 640 (e.g., to provide support for a type of RAM that may be referred to as "system memory"). The memory controller hub 626 further includes a LVDS interface 632 for a display device 692 (e.g., a CRT, a flat panel, a projector, etc.). A block 638 includes some technologies that may be supported via the LVDS interface 632 (e.g., serial digital video, HDMI/DVI, display port). The memory controller hub 626 also includes a PCI-express interface (PCI-E) 634 that may support discrete graphics 636.

In FIG. 6, the I/O hub controller 650 includes a SATA interface 651 (e.g., for HDDs, SDDs, etc.), a PCI-E interface 652 (e.g., for wireless connections 682), a USB interface 653 (e.g., for input devices 684 such as keyboard, mice, cameras, phones, storage, etc.), a network interface 654 (e.g., LAN), a GPIO interface 655, a LPC interface 670 (for ASICs 671, a TPM 672, a super I/O 673, a firmware hub 674, BIOS support 675 as well as various types of memory 676 such as ROM 677, Flash 678, and NVRAM 679), a power management interface 661, a clock generator interface 662, an audio interface 663 (e.g., for speakers 694), a TCO interface 664, a system management bus interface 665, and SPI Flash 666, which can include BIOS 668 and boot code 690. The I/O hub controller 650 may include gigabit Ethernet support.

The system 600, upon power on, may be configured to execute boot code 690 for the BIOS 668, as stored within the SPI Flash 666, and thereafter processes data under the control of one or more operating systems and application software (e.g., stored in system memory 640). An operating system may be stored in any of a variety of locations and accessed, for example, according to instructions of the BIOS 668. As described herein, a device may include fewer or more features than shown in the system 600 of FIG. 6.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method, comprising:
   receiving handwriting input at a first device;
   executing, at the first device, handwriting recognition on the handwriting input to render a first recognition result comprising first text derived from the handwriting input;
   evaluating confidence in at least a portion of the first recognition result;
   in response to identification of a confidence evaluation for at least a portion of the first recognition result as being below a threshold level, sending data pertaining to at least a first portion of the handwriting input to a second device different from the first device and sending the first text to the second device, wherein the threshold level varies based on a speed of communication of the first device with the second device; and
   receiving from the second device a second recognition result comprising second text derived from the data.

2. The method of claim 1 wherein sending the data pertaining to the first portion of the handwriting input to the second device comprises transmitting to the second device data corresponding to the portion of the first recognition result evaluated as being below the threshold level, the data corresponding to the portion of the first recognition result evaluated as being below the threshold level comprising at least one character derived from the first portion of the handwriting input.

3. The method of claim 1 wherein sending the data pertaining to at least the first portion of the handwriting input to the second device comprises transmitting to the second device ambiguous handwriting data corresponding to at least one low confidence character recognized from the received handwriting input.

4. The method of claim 3 wherein evaluating confidence comprises determining that at least one character of the received handwriting input implicates ambiguous candidates.

5. The method of claim 1 wherein outputting data based on the first text and the second text comprises comparing a confidence score associated with at least one character of the first recognition result with another confidence score associated with at least one character of the second recognition result.

6. The method of claim 1 further comprising encoding the first text and the data pertaining to at least the first portion of the handwriting input for sending the data pertaining to at least the first portion of the handwriting input.

7. The method of claim 1, further comprising:
outputting data at the first device based on the first text and the second text.

8. The method of claim 7 wherein outputting data based on the first text and the second text comprises merging the first text and the second text and presenting the merged first text and second text at the first device.

9. A method, comprising:
receiving speech input at a first device;
converting the speech input to first text, wherein convening of the first portion comprises identifying at least a first potential candidate corresponding to the first portion and a second potential candidate corresponding to the first portion;
determining that at least a first portion of the speech input cannot be identified with at least a threshold level of confidence;
transmitting the first text to a second device; and
receiving, from the second device, second text comprising at least a portion of the first text and comprising one of the first potential candidate and the second potential candidate;
wherein the threshold level of confidence varies based on a speed of communication of the first device with the second device.

10. The method of claim 9, comprising:
outputting the second text at the first device.

11. The method of claim 9, wherein the first text is transmitted to the second device in an order in which respective portions of the speech input are received that correspond to respective portions of the first text.

12. The method of claim 9, comprising:
encoding the first text for transmission to the second device.

13. A first device, comprising:
a processor; and
storage accessible to the processor, the storage bearing instructions executable by the processor to:
receive speech input;
determine that at least a first portion of the speech input cannot be identified with at least a threshold level of confidence;
convert the speech input to first text, wherein conversion of the first portion comprises identifying at least a first potential candidate corresponding to the first portion and a second potential candidate corresponding to the first portion;
transmit the first text to a second device; and
receive, from the second device, second text comprising at least a portion of the first text and comprising one of the first potential candidate and the second potential candidate;
wherein the threshold level of confidence varies based on a speed of communication of the first device with the second device.

14. The first device of claim 13, wherein the instructions are executable to:
output the second text at the first device.

15. The first device of claim 13, wherein the first text is transmitted to the second device in an order in which respective portions of the speech input are received that correspond to respective portions of the first text.

* * * * *